Figure 1A:
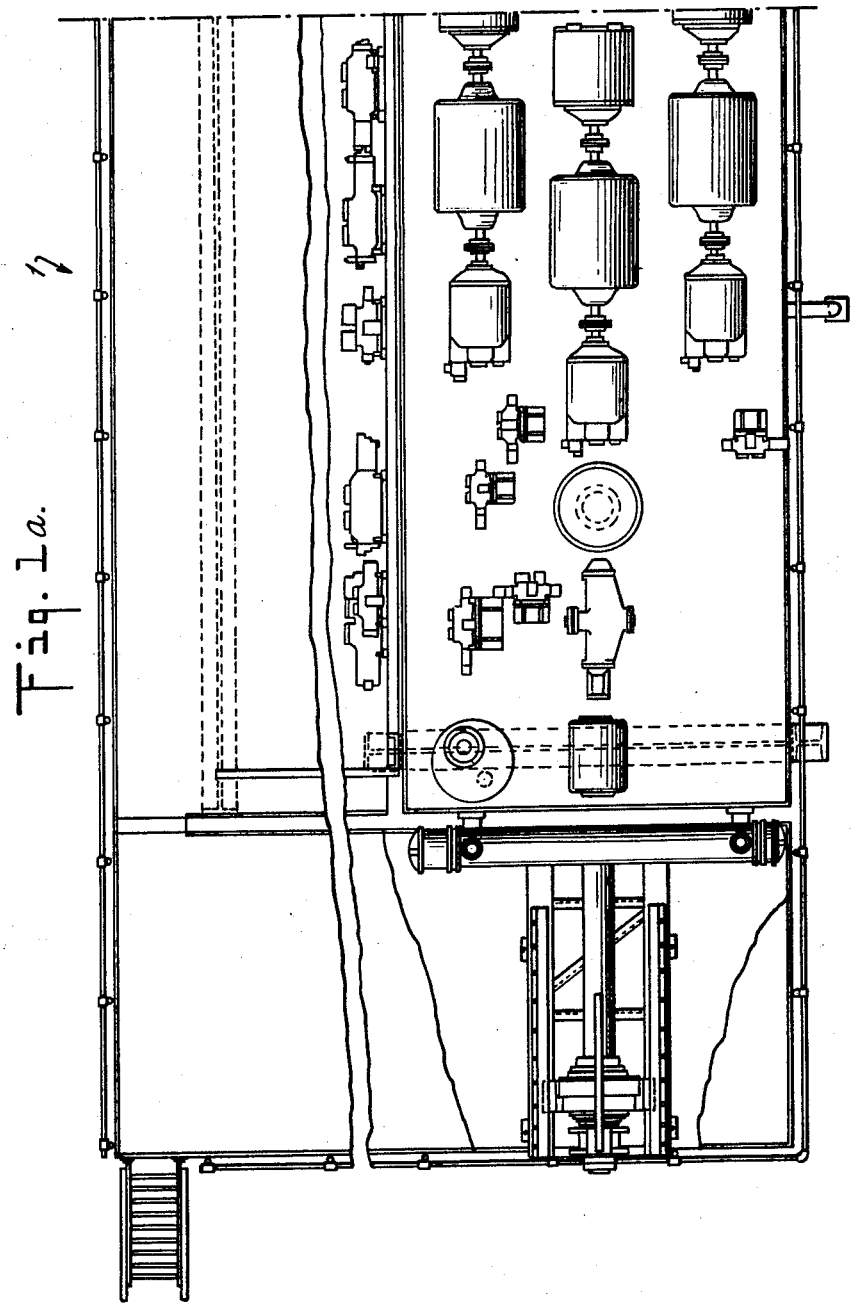

May 25, 1965 W. L. GOVAN 3,184,946
DIE SLIDE GIB ADJUSTMENT ON AN EXTRUSION PRESS
Filed Jan. 29, 1962 4 Sheets-Sheet 1

INVENTOR.
WILLIAM L. GOVAN
BY
ATTORNEYS.

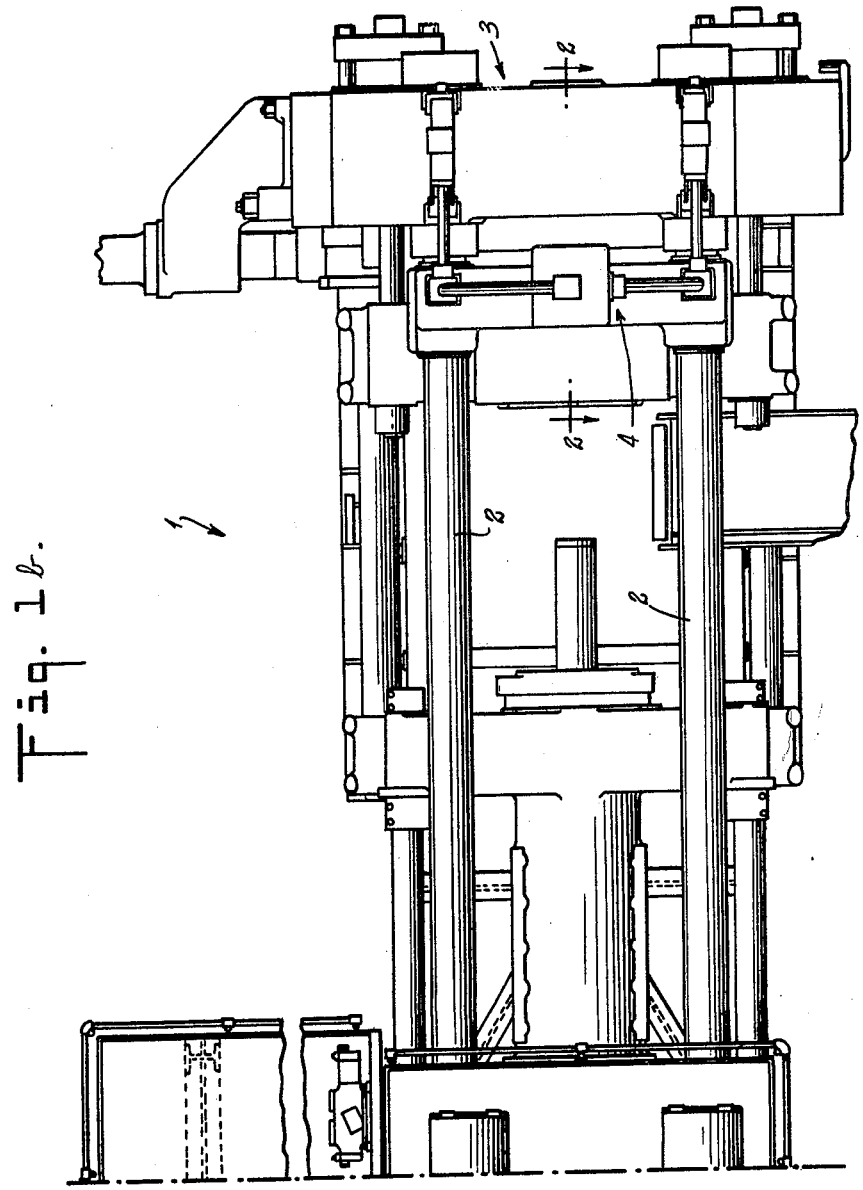

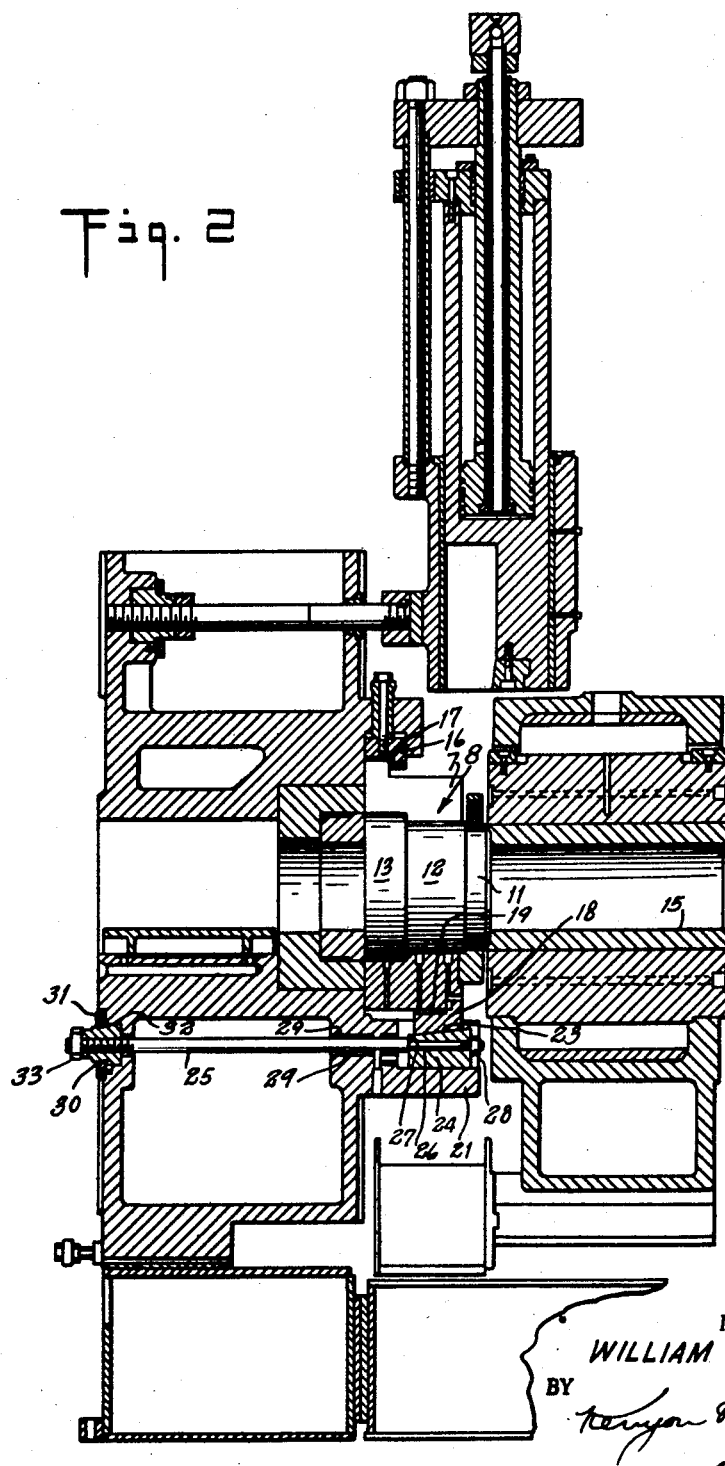

May 25, 1965 W. L. GOVAN 3,184,946
DIE SLIDE GIB ADJUSTMENT ON AN EXTRUSION PRESS
Filed Jan. 29, 1962 4 Sheets-Sheet 4

INVENTOR.
WILLIAM L. GOVAN
BY Kenyon & Kenyon
ATTORNEYS

United States Patent Office 3,184,946
Patented May 25, 1965

3,184,946
DIE SLIDE GIB ADJUSTMENT ON AN
EXTRUSION PRESS
William L. Govan, Brighton, N.Y., assignor to Farrel
Corporation, a corporation of Connecticut
Filed Jan. 29, 1962, Ser. No. 169,308
1 Claim. (Cl. 72—263)

This invention relates to hydraulic extrusion presses and more particularly to their die slide gib adjustment.

It is an object of this invention to provide for conveniently adjusting the vertical position of the die slide and thereby the die of an extrusion press, and to make possible that adjustment from the rear face of the end platen.

It is a further object of this invention to provide solid support for that portion of the die slide which must withstand the stresses of the shearing operation without distortion or change of the adjustment.

Briefly, extrusion presses of a sort commonly used include a slide for inserting a die into the presses and holding it there during the extrusion operation. This die runs on upper and lower gibs which are adjusted so that the vertical position of the shaped opening in the various dies which are used can be aligned with the billet container and ram. The transverse alignment of the die opening, of course, is accomplished by controlling the transverse movement of the die slide by limit stops or otherwise.

Since the die holds the butt end of the billet which remains at the conclusion of an extrusion stroke by the ram, it is the die slide and the lower gib which must support the die against the downward pressure generated by the shearing operation. It is therefore desirable for the lower gib adjustment to be capable of withstanding without wear or distortion the large shearing thrust and to evenly support the lower gib over as wide an area as possible.

Heretofore, the gib was supported by the shoulder of a threaded bolt which extended up through the end platen frame to engage lower surface of the gib. Gib adjustment was made by rotating this vertical bolt.

According to this invention, the old adjustment is retained for the outboard portions of the gib, which are not subjected to the shearing stresses, but it is replaced in the center by a special wedge arrangement located directly below the die. This wedge is constructed with a horizontal cylinder or plug that is longitudinally aligned with the press axis and supported on a channel in the end platen frame. The upper surface of the cylinder is a flat surface inclined toward the back or delivery end of the press, and it engages a similarly inclined surface on the underside of the lower gib. The elevation of the gib is adjusted by moving the cylindrical plug-wedge in and out. This is accomplished by means of a rod extending from the plug to threadably engage a rotatable round nut axially restrained in the rear face of the end platen.

Figure 3:
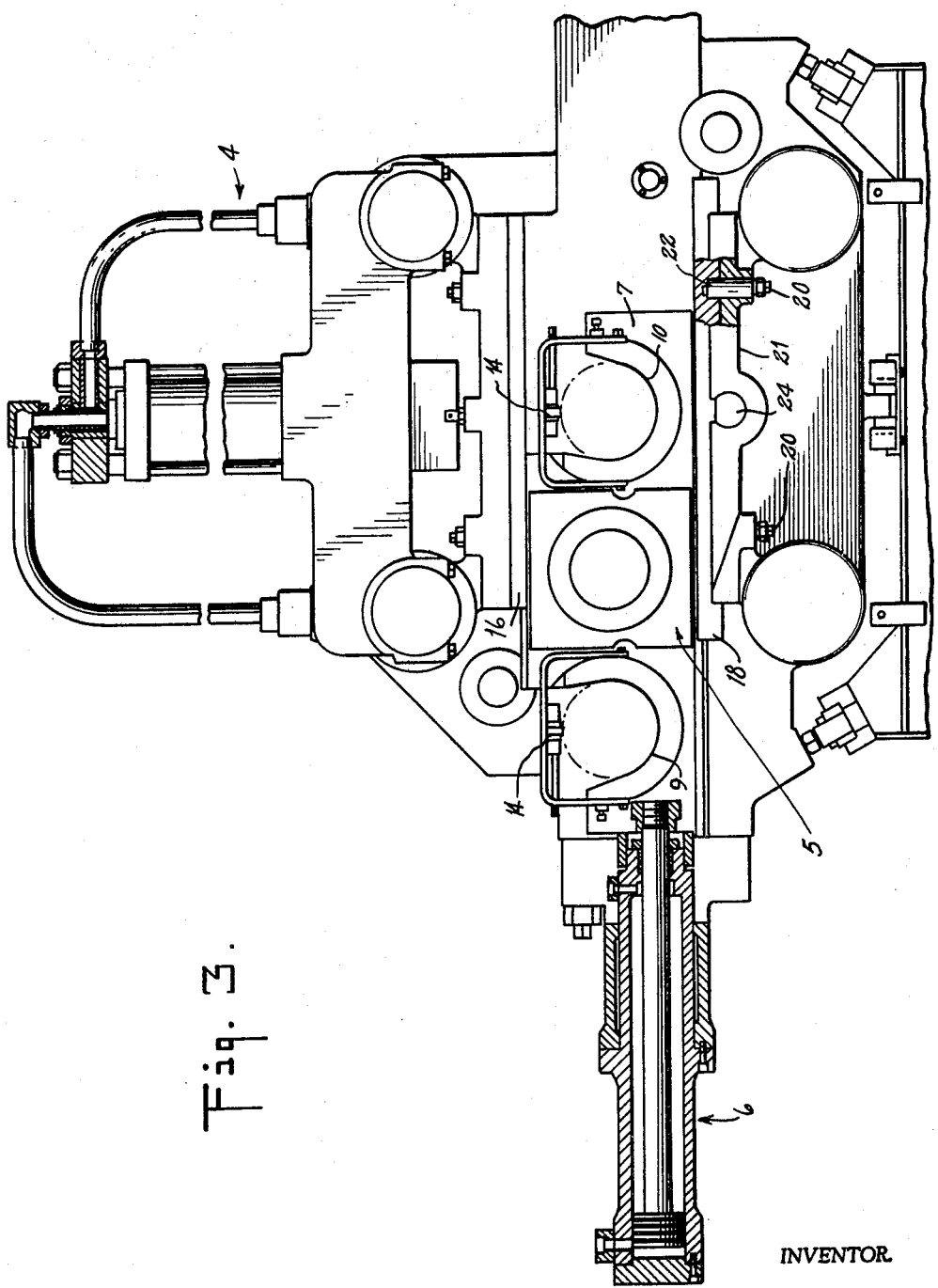

The invention is described below in more detail with reference to the following drawings in which:

FIGURES 1a and b is a plan view of a hydraulic extrusion press incorporating the invention;

FIGURE 2 is a side sectional elevation of the end platen assembly for the press taken generally along line 2—2 in FIGURE 1; and FIGURE 3 is an inner end elevation of the shear and end platen assembly for the same machine.

This invention is illustrated as a part of the modern high pressure metal extrusion press 1 shown in FIGURE 1 which may be of conventional design except as hereinafter changed. The press, of course, includes main tie rods 2, an end platen assembly 3, some shear assembly 4, and a die slide assembly 5 with an actuating cylinder assembly 6.

The die slide assembly 5 includes a die slide 7 that is equipped to receive a die 8 at either end in receptacles 9 and 10. The die 8 may be conventionally fabricated with a plate insert 11, die holder 12, and bolster 13 and it is held in position by clamping devices 14.

When the die slide is moved to one side, receptacle 9 is positioned in front of the billet container 15 and held there during the extrusion operation while the receptacle 10 is accessible for the change or cooling of dies. Moving the slide to the other side holds the die in receptacle 10 for the extrusion, and frees the die in receptacle 9. The reciprocation of the slide is conventionally powered by the hydraulic cylinder assembly 6 to end positions which are adjusted by the usual stops.

The slide is guided at the top by gib 16 which bears against the slide with bearings or flat wear strips 17. The slide is supported and guided below by a lower gib 18 that is provided with bearings or flat wear strips 19.

The lower gib is supported on the frame of end platen 3 by means which are adjustable so that the vertical elevation of die slide and thereby the shaped die opening will be in alignment with the billet container 15. The support at the outboard ends of the gib is by means of vertical bolts 20 that thread upward through the extension 21 of the end platen frame 22 to directly engage the lower surface of the gib 18 with shoulder portions 22. The center portion of the gib 18 is supported by the following wedge assembly. The gib is provided with a smooth lower surface 23 inclined toward the tail end of the press about a horizontal axis transverse to the axis of the press or the press bed. The end platen frame extension 21 immediately below this inclined gib surface is chambered to receive a generally cylindrical plug 24 that has a flattened upper wedge surface inclined and positioned to mate with the inclined gib surface 23.

The plug 24 is moved in and out by means of a shaft or rod 25 that passes through a longitudinally aligned bore 26 that extends through the plug. The shaft is restrained from axial movement relative to the plug by shoulder 27 and nut 28. Shaft 25 is journaled by bearings 29 in the end platen frame and at its tail end threadably engages a rotatable round nut 30 which is recessed in the back of the end platen and restrained from axial movement by a retaining ring 31 that bears against nut shoulder 32. The extension of the shaft 25 and thereby of the wedge shaped cylinder is thereby adjusted by rotation of the round nut 30, and held in position by lock nut 33 which threadably engages the shaft adjacent the rotatable round nut. The axis of the chamber in the end platen frame and the cylindrical plug are parallel to the axis of the press. As the wedge shaped plug moves along this axis, its upper surface bears against the gib's inclined lower surface 23. The gib is raised and lowered as the plug is moved to the tail and head of the press, respectively.

I claim:

A horizontal hydraulic extrusion press having an end platen with a die slide at one end thereof, an upper and lower gib for supporting said die slide at said one end, a wedge assembly for adjustably supporting said lower gib on said one end of said end platen including a plug having a flattened upper surface inclined about a horizontal axis transverse to the press axis toward the tail end of the press, a flattened lower surface on said lower gib inclined to mate with the inclined surface of the plug, and means including a rod extending between said plug at said one end of said end platen and a round nut at the other end of said end platen, said rod attached at one end to said plug and threadably engaged at the other end by said round nut, which is rotatably journaled and axially restrained at the said other end of said end platen for moving said plug in and out along the direction of the press axis to raise and lower said lower gib and thereby said die slide, said rod extending through said other end of said end platen so as to enable said plug to be horizontally adjusted from outside of said extrusion press.

References Cited by the Examiner
UNITED STATES PATENTS

| | | | |
|---|---|---|---|
| 1,286,726 | 12/18 | Noble | 207—1.2 |
| 1,382,571 | 6/21 | Terhune | 78—37 |
| 1,404,150 | 1/22 | Smith | 78—37 |
| 2,172,867 | 9/39 | Dreyer | 207—17 |
| 2,365,482 | 12/44 | Manken et al. | 207—18 XR |
| 2,435,849 | 2/48 | Schlitters | 78—37 |
| 2,960,220 | 11/60 | Katko | 207—1.1 |

MICHAEL V. BRINDISI, *Primary Examiner.*

WILLIAM W. DYER, Jr., CHARLES W. LANHAM,
*Examiners.*